United States Patent
Fletcher

(10) Patent No.: US 8,474,013 B2
(45) Date of Patent: Jun. 25, 2013

(54) SECURELY MANAGING PASSWORD ACCESS TO A COMPUTER SYSTEM

(75) Inventor: James C. Fletcher, Alta, NC (US)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 13/074,555

(22) Filed: Mar. 29, 2011

(65) Prior Publication Data

US 2012/0254956 A1 Oct. 4, 2012

(51) Int. Cl.
*H04L 9/32* (2006.01)
(52) U.S. Cl.
USPC .................. 726/2; 726/3; 726/4; 726/5; 726/6
(58) Field of Classification Search
USPC .......... 713/165, 168–170, 182–186; 726/1–7, 726/16–21, 26–30
See application file for complete search history.

(56) References Cited

U.S. PATENT DOCUMENTS

| | | | |
|---|---|---|---|
| 6,389,534 B1 * | 5/2002 | Elgamal et al. | 713/164 |
| 2004/0177272 A1 | 9/2004 | Walters | |
| 2007/0005988 A1 | 1/2007 | Zhang | |
| 2008/0114986 A1 | 5/2008 | Morris et al. | |
| 2009/0055910 A1 | 2/2009 | Lee | |
| 2010/0031343 A1 | 2/2010 | Childress et al. | |
| 2010/0208888 A1 | 8/2010 | Weber | |
| 2011/0138176 A1 * | 6/2011 | Mansour | 713/168 |

* cited by examiner

*Primary Examiner* — Hosuk Song
(74) *Attorney, Agent, or Firm* — Paul S. Drake

(57) ABSTRACT

A method, system or computer usable program product for providing initial access Lo the computer system in response to a user providing a first password, and upon detecting a condition meeting a predetermined criteria, providing subsequent access to the computer system in response to the user providing a second password wherein the first password has stronger security than the second password.

20 Claims, 6 Drawing Sheets

SECURELY MANAGING PASSWORD ACCESS TO A COMPUTER SYSTEM

BACKGROUND

1. Technical Field

The present invention relates generally to managing access to a computer system, and in particular, to a computer implemented method for securely managing password access to a computer system.

2. Description of Related Art

Passwords are an intrinsic part of functioning within a computerized society. Computer systems often require that a user is authenticated or verified before the user is granted initial or continuing access. Often this authentication or verification is accomplished by requiring the user to enter a password, sometimes with a username, that are known to both the computer system and the user.

Computer systems requiring authentication or verification may be computer devices and/or computer software applications. A computer device requiring a password may be a server, desktop computer, laptop, mobile phone, smart phone, or other type of stationary, portable or mobile device. A computer software application requiring a password for access may be an operating system, browser, website, software program, or other type of software such as a smart phone application.

SUMMARY

The illustrative embodiments provide a method, system, and computer usable program product for providing initial access to the computer system in response to a user providing a first password, and upon detecting a condition meeting a predetermined criteria, providing subsequent access to the computer system in response to the user providing a second password wherein the first password has stronger security than the second password.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

DETAILED DESCRIPTION

Figure 1:
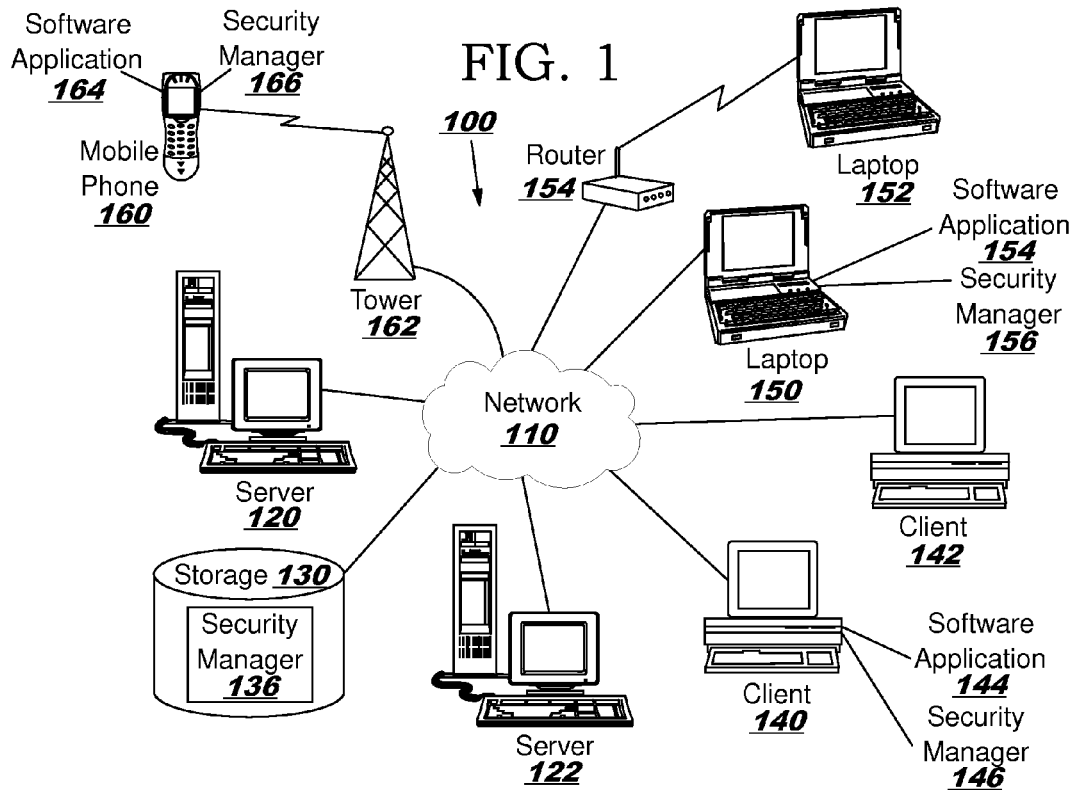
FIG. 1 depicts a block diagram of a network of data processing systems in which various embodiments may be implemented.

FIG. 1 depicts pictorial representation of a network of data processing systems in which various embodiments may be implemented. Data processing environment 100 is a network of data processing systems also known as computers or computer devices in which the embodiments may be implemented. Software applications may execute on any computer or other type of data processing system in data processing environment 100. Data processing environment 100 includes network 110. Network 110 is the medium used to provide communications links between various devices and computers connected together within data processing environment 100. Network 110 may include connections such as wire, wireless communication links, or fiber optic cables.

Servers 120 and 122 and clients 140 and 142 are coupled to network 110 along with storage unit 130. In addition, laptops 150 and 152 are coupled to network 110 including wirelessly through s network router 154. A mobile phone 160 is also coupled to network 110 through a mobile phone tower 162. Data processing systems, such as server 120 and 122, client 140 and 142, laptops 150 and 152, and mobile phone 160, may contain data and may have software applications including software tools executing thereon. Other types of data processing systems such as personal digital assistants (PDAs), smart phones, tablets and netbooks may be coupled to network 110.

Storage 130 may include security manager 136 for managing access to the various computer devices or software applications in accordance with embodiments described herein. Client 140 may include software application 144 and security manager 146. Laptop 150 and mobile phone 160 may also include software applications 154 and 164 and security managers 156 and 166. Other types of data processing systems coupled to network 110 may also include software applications and security managers. Software applications could include a web browser, email, or other software application that can process a web page, email, or other type of information to be processed.

Servers 120 and 122, storage unit 130, clients 140 and 142, laptops 150 and 152, and mobile phone 160 and other data processing devices may couple to network 102 using wired connections, wireless communication protocols, or other suitable data connectivity. Clients 140 and 142 may be, for example, personal computers or network computers.

In the depicted example, server 120 may provide data, such as boot files, operating system images, and applications to clients 140 and 142 and laptop 150. Clients 140 and 142 and laptop 150 may be clients to server 120 in this example. Clients 140 and 142, laptops 150 and 152, mobile phone 160, or some combination thereof, may include their own data, boot flies, operating system images, and applications. Data processing environment 100 may include additional servers, clients, and other devices that are not shown. For example, other mobile devices may also be connected, to network 102 including smart phones, tablets, personal digital assistants (PDAs), etc.

In the depicted example, data processing environment 100 may be the Internet. Network 110 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

Figure 2:
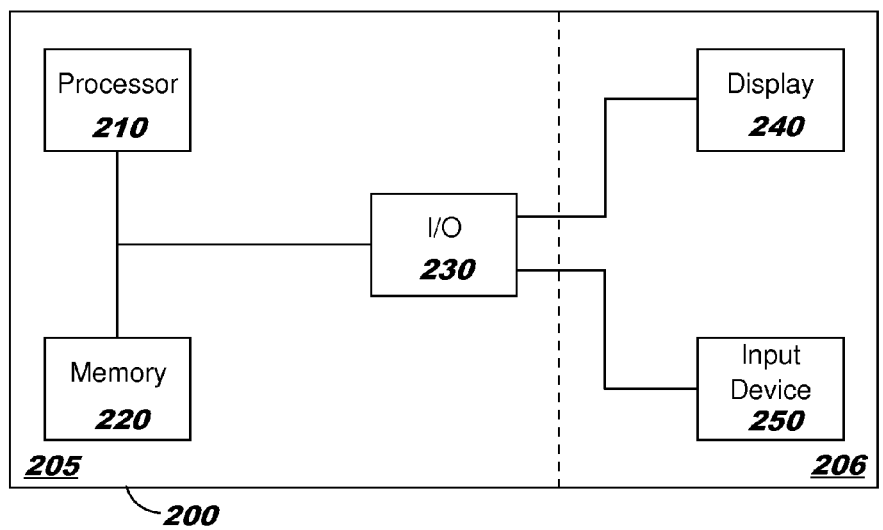
FIG. 2 depicts a block diagram of a data processing system in which various embodiments may be implemented.

FIG. 2 depicts a block diagram of a data processing system in which various embodiments may be implemented. Data processing system 200 is an example of a computer device, such as server 120, client 140, laptop 150 or mobile phone 160 in FIG. 1, in which computer usable program code or instructions implementing the processes may be located for the illustrative embodiments.

In the depicted example, data processing system 200 includes a CPU or central processing unit 210 which may contain one or more processors and may be implemented using one or more heterogeneous processor systems including a graphics processor. The depicted example also includes a memory 220 which may be used tor storing instructions and data to be processed by CPU 210. Memory 220 may include a main memory composed of random access memory (RAM), read only memory (ROM), or other types of storage devices. Memory 210 could also include secondary storage devices such as a hard disk drive, DVD drive or other devices which may be internal or external to data processing system 200. An input output device (I/O) 230 is also shown in the depicted example for managing communications with various input devices and output devices. However, other examples could use the CPU to communicate directly with various input or output devices or use separate input and output controllers.

In the depicted example, a display 240 is shown for the data processing system to communicate with a user or another data processing system. Other types of output devices may be used such as an audio device. An input device 250 is also shown which may be a keyboard, mouse, a touch sensitive display, or other types of input devices.

Data processing system 200 is shown with an internal section 205 and an external section 206. Often input and output devices may be physically separate from but connected to the CPU and memory. However, that is often not the case such as in mobile phones.

An operating system may run on processor 210. The operating system coordinates and provides control of various components within data processing system 200 in FIG. 2. The operating system may be a commercially available operating system. An object oriented programming system may run in conjunction with the operating system and provides calls to the operating system from programs or applications executing on data processing system 200. Instructions for the operating system, the object-oriented programming system, and applications or programs may be located on secondary storage devices such a hard drive, and may be loaded into RAM for execution by processing unit 210.

The hardware in FIGS. 1-2 may vary depending on the implementation. Other internal hardware or peripheral devices, such as flash memory, equivalent non-volatile memory, or optical disk drives and the like, may be used, in addition to or in place of the hardware depicted in FIGS. 1 and 2. In addition, the processes of the embodiments may be applied to a multiprocessor date processing system.

The depicted examples in FIGS. 1-2 and above-described examples are not meant to imply architectural limitations. For example, data processing system 200 may also be a mobile phone 160, tablet computer, laptop computer, or telephone device.

Figure 3:
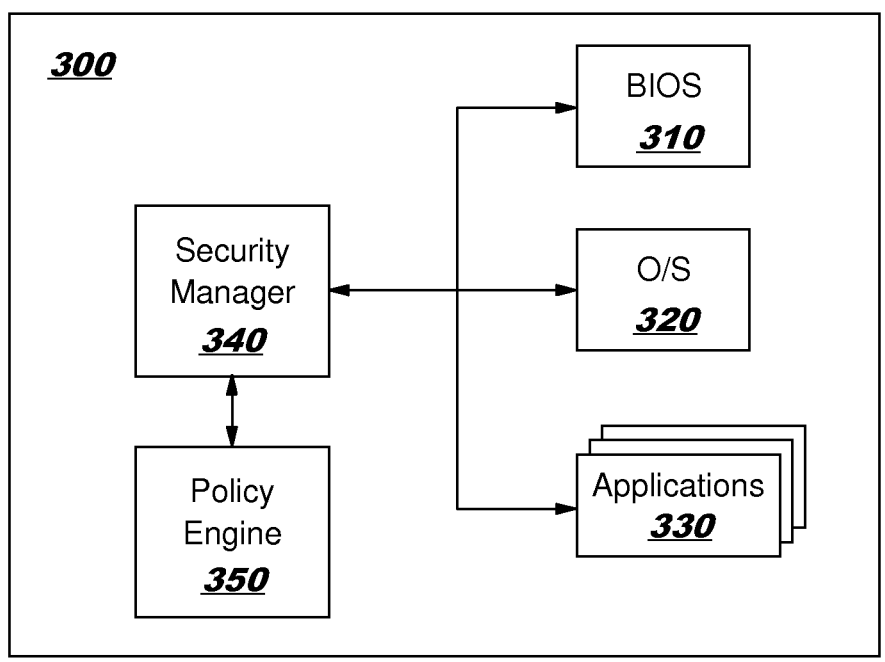
FIG. 3 depicts a block diagram of a software space for a data processing system in which various embodiments may be implemented.

FIG. 3 depicts a block, diagram of software environment for a data processing system in which the preferred embodiment may be implemented. In a software environment 300, various software applications may be used by the data processing system for initializing (booting) and running the data processing system. These software programs may be located in the local memory of the data processing system or in the memory of other connected data processing systems such as memory storage of a server.

A BIOS 310 may be used for initializing the data processing system and for various base functions. BIOS (basic input/output system) is typically stored in a local non-volatile memory such as ROM or flash memory on a data processing system motherboard. An operating system (O/S) 320 is used for managing the various computer hardware resources and provides common services for efficient execution of application software. Software applications 330 may be used to perform singular or multiple related specific tasks or functions. An example of a software application would be an internet browser, spreadsheet program, email application, video game, or other function.

Security manager 340 may be used to manage password protection for the data processing system in accordance with the various embodiments described below. Security manager may be called or invoked by each of the types of software shown herein. That is, BIOS 310 may invoke security manager 340 during system initialization. In the preferred embodiment, O/S 320 may invoke security manager 340 upon certain conditions such as when the system is turned on (after BIOS has initialized the system) or when the user attempts to start any application. Any application 330 may also invoke the security manager such as when the application is first started by the user.

Policy engine 350 may be invoked by the security manager. Policy engine may contain the conditions and criteria for determining whether a user may be granted access to a computer system (hardware or software), whether a password may be required, which password may be required for granting access, or whether the user may be denied access. Policy engine 350 may be a separate software entity from security manager 340 or both may be implemented as a single combined entity.

Security manager 340 and/or policy engine 350 may also be incorporated in any of the software used by the data processing system. For example, security manager could be included as part of BIOS 310, O/S 320, or any application 330.

Security manager 340 may be on a particular device such as a mobile phone, PDA, laptop, desktop or other device. Policy engine 350 may be implemented on the same device or on a separate device. For example, security manager could be implemented on a mobile phone while the policy engine may be implemented in a server. In such a case, the security manager may be invoked by the user's actions on a device and then the security manager invokes the policy engine to notify the security manager which action to take (e.g. allow access, require a password or deny access). This and other approaches would allow a central administrator to manage a single policy engine for a multitude of devices.

Another embodiment could use a policy engine on the user device with a centralized set of conditions and criteria stored on a server. The policy engine may then periodically query the conditions and criteria on the server (such as through a localized proxy server) to obtain the latest version of those conditions and criteria and then store those locally for implementation. There are additional alternative approaches where the centralized conditions and criteria may be pushed by the server to user devices with security managers and policy engines. If the policy engine for a user device cannot access the centralized conditions and criteria stored on a server or if no update has been received for a period of time, then a stricter default set of conditions and criteria may be automatically adopted to implement a higher level of security.

Operation of the security manager and policy engine may be session based such as where a given application or website may have certain security requirements. In such a case, the application or website may contain the policy engine and rely on the user device security manager to enforce that security. For example, an application or website may require a very secure password for initial access and then require a second shorter password periodically to allow the user to continue access. In this example, the policy manager may be located on the website server or in the application programming. In an alternative embodiment, the website or application may provide the conditions and criteria for enforcement by the user device security manager and policy engine. In such a case, the conditions and criteria may be downloaded to the user device policy engine, such as with a cookie, when the website or application is initially contacted by the user device. As a result, the user device security manager and policy engine may be used in helping manage such session based security for websites, applications or other types of resources. In these cases, the security manager may be invoked by the website or application for enforcing certain conditions and criteria.

Figure 4:
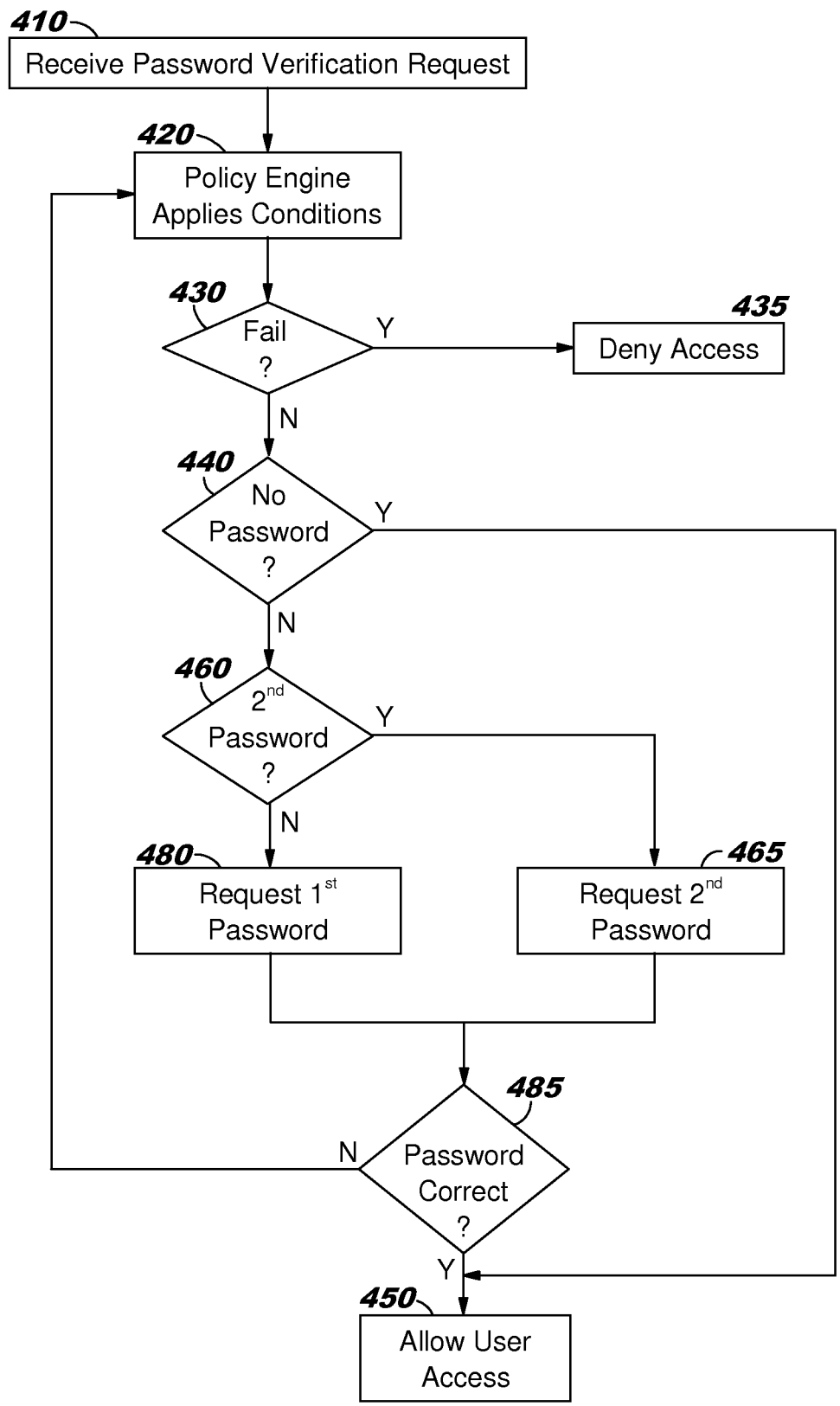
FIG. 4 depicts a flowchart of the operation of a security manager in which the various embodiments may be implemented.

FIG. 4 depicts a flowchart of the operation of a security manager in which the various embodiments may be implemented. This process describes the use of a first password and a second password where the first password has stronger security than the second password. However, a second password would typically be easier for a user to type or otherwise enter and would often be preferred by the user in most cases as a result. Alternative security manager embodiments could also be implemented by one of ordinary skill in the art.

In step 410, the security manager may be invoked by BIOS, an operating system, an application, or other software program in response to an action by the user or in response to certain conditions be met by the invoking software program. For example, if the user attempts to open a new application on a smart phone, the smart phone operating system may invoke the security manager. Certain information may be passed to the security manager including the location of a computer device, the type of action which caused the security manager to be invoked, or other information useful by the security manager.

In step 420, various conditions may be applied by a policy engine based on the information passed to the security manager and any other information known by the security manager such as the last time it was invoked. These conditions and their criteria are described in greater detail below with reference to FIG. 5.

In step 430, it is determined whether the conditions were not met so that the user or invoking software fails. If so, then access is denied in step 435 to the user or invoking software. In step 440, if conditions are met such that no password is needed, then access is granted to the user or invoking program in step 450.

In step 460, if certain conditions are met from the policy engine conditions in step 420, then a second password may be acceptable. The second password is typically a shorter and easier to type or enter than a first password. If a second password is acceptable, then in step 465 the user is queried for the second password. Once received, the second password is checked in step 485 against the second password previously stored in the data processing system (or elsewhere accessible by the data processing system). If correct, then the second user or invoking software in allowed access. In the preferred embodiment, the first password may also be acceptable in lieu of the second password. If the second (or first) password was not correct, the processing returns to step 420.

In step 480, if a second password would not acceptable according to the policy engine conditions in step 420, then the user is queried for the first password. If, in step 435, the first password provided is correct, then the user is allowed access, otherwise processing returns to step 430.

Figure 5:
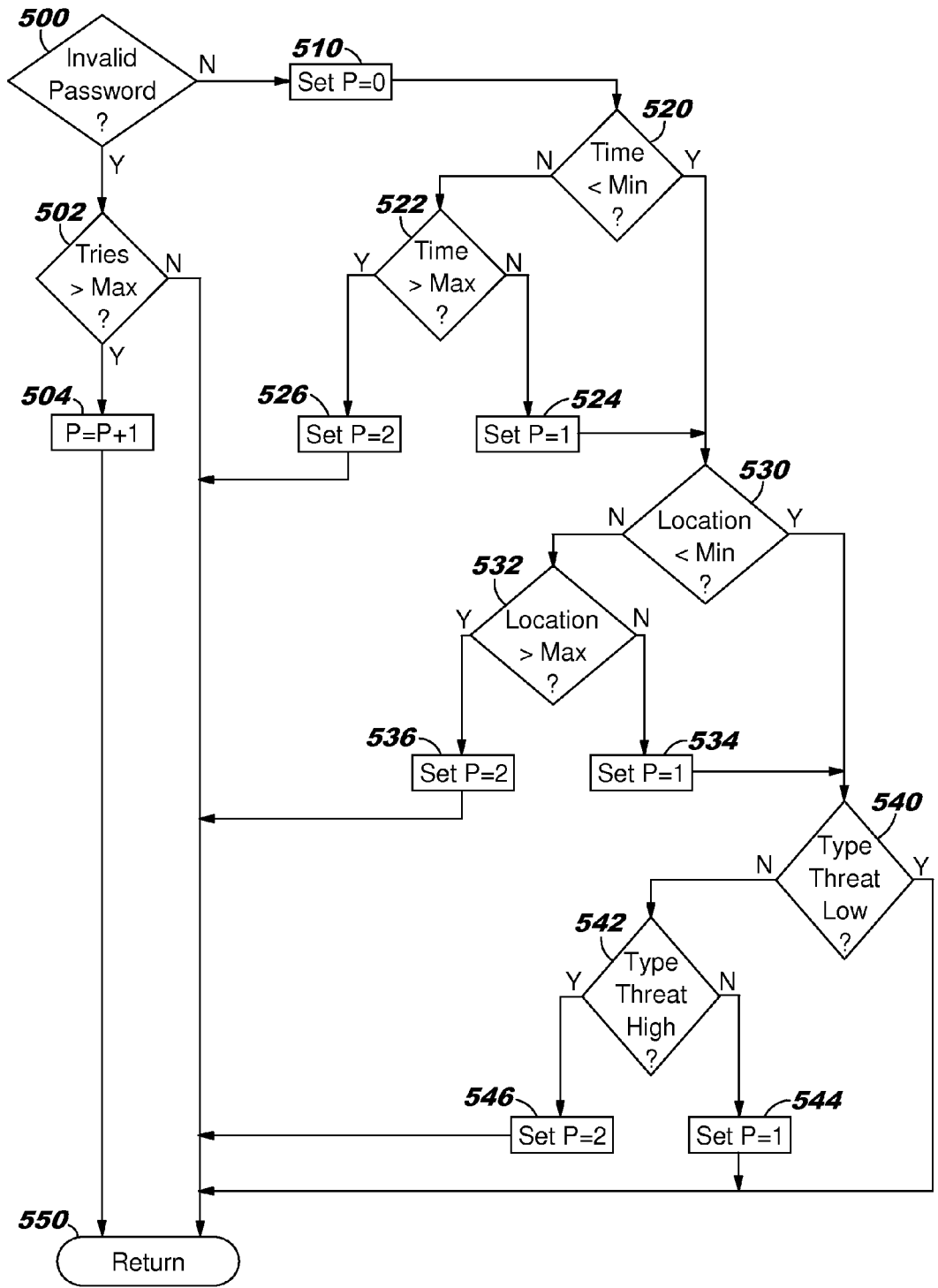
FIG. 5 depicts a flowchart of the operation of a policy engine in which a first embodiment may be implemented.

FIG. 5 depicts a flowchart of the operation of a policy engine in which a first embodiment may be implemented. In this first embodiment, FIG. 5 provides an example of the conditions applied in step 420 of FIG. 4, although alternative examples and embodiments could easily be implemented such as in FIG. 7 below.

In this first embodiment, the variable P may indicate what password the user must provide. If P is equal to 0, then no password is required. If P is equal to 1, then the second password is acceptable. If P is equal to 2, then the first password is required. If P is equal to 3, then access is denied.

In a first step 500, it may be determined whether an invalid password was previously provided. If not, then processing continues to step 510. If yes, then in step 502 it may be determined whether the number on invalid password attempts is greater than the number of acceptable tries. If no in step 502, then processing returns in step 550 to allow the user to attempt the password again. If yes in step 502, then P is increased by one and processing returns in step 550. As a result, if P was previously equal to 1 allowing a second password, then the user must now provide the first password. If P was previously equal to 2 allowing only a first password, then the user may be denied access.

In step 510, P is set to 0. In step 520, it may be determined whether the time since the first password was previously entered is less than a minimum. If yes, then processing continues to step 530. If not, then in step 522 it may be determined whether the time since the first password was entered is greater than a maximum. If yes, the P is set equal to 2 and processing returns in step 550. If not, then P is set equal to 1 and processing continues to step 530.

In step 520, it may be determined whether the time since the first password was previously entered is less than a minimum. If yes, then processing continues to step 530. If not, then in step 522 it may be determined whether the time since the first password was entered is greater than a maximum. If yes, the P is set equal to 2 and processing returns in step 550. If not, then P is set equal to 1 and processing continues top step 530.

In step 530, it may be determined whether the location of the user is within a minimum distance from a desired location or locations (such as within a few feet of the user's work location). If yes, then processing continues to step 540. If not, then in step 532 it may be determined whether the user is outside a maximum distance from a desired location(s). If yes, the P is set equal to 2 and processing returns in step 550. If not, then P is set equal to 1 and processing continues top step 540.

In step 540, it may be determined whether the action taken by the user or the type of device being used by the user is a low level threat (such as opening a browser on a desktop computer). If yes, then processing returns in step 550. If net, then in step 542 it may be determined whether the action taken by the user or the type, of device being used by the user is a high level threat (such as opening a high security database on a mobile phone). If yes, then P is set equal to 2 and processing returns in step 550. If not, then P is set equal to 1 and processing returns in step 550.

Figure 6:
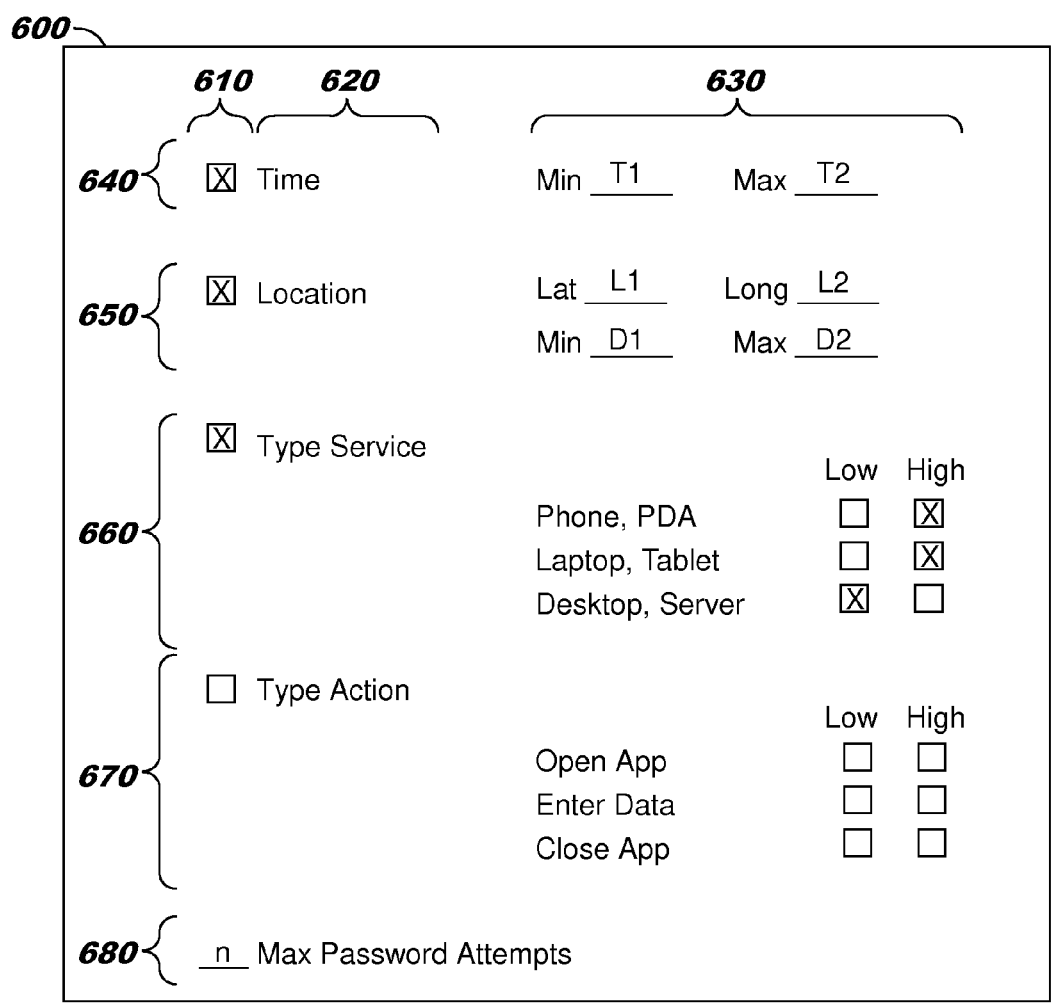
FIG. 6 depicts a graphical user interface for setting forth conditions of the policy engine in accordance with the first embodiment.

FIG. 6 depicts a graphical user interface for setting forth conditions and criteria of the policy engine in accordance with the first embodiment. This graphical user interface (GUI) may be used by a user of the data processing system such as a mobile phone or it may be used by an administrator of a network of data processing systems. The administrator may lock this GUI so that no user may adjust its settings. Alternative embodiments may use a different GUI or may require independent programming or other approaches to implement the policy engine.

A graphical user interface window 600 is shown with a variety of boxes to be checked and blanks to be filled in. The conditions and criteria set forth below or in alternative embodiments may be implemented for a single application or all applications for a given user device or all devices on a network.

In column 610 a user or administrator may select which conditions to apply. In this embodiment, if a box is not checked, then the condition to the right of the box is not implemented. Column 620 provides the type of condition that could be applied. Although several conditions are shown in FIG. 6, different and additional conditions may be used. Column 630 provides the specific criteria or limits for the selected conditions as described below.

Row 640 depicts a time condition and criteria that has been selected in this case as indicated with the checked box in column 610. The time criteria may be the time since the user entered a valid password, although alternative embodiments may use alternative time measures. The user may provide a minimum time and a maximum time in this case. The time entered could be in seconds, minutes or alternative measure of time. Referring back to FIG. 5, if the actual time since the last valid password entry is less than the minimum, then no password is needed. If the time is greater than the minimum but less than the maximum, then the user may need to enter a second password. If the time is greater than the maximum, then the user may need to enter a first password which is typically longer and stronger than the second password.

Row 550 depicts a location condition that has been selected in this case as indicated with the checked box in column 610. The user or administrator may provide latitude and longitude criteria as well as a minimum and maximum distance range criteria. For example, if a data processing device such as a laptop or smartphone is within a minimum distance from a user's workplace (or alternatively a home), then no password is needed. If the data processing device is at a greater distance than a minimum but less than a maximum, then a second password may be needed. If the data processing system is outside a maximum distance then a first password may be needed.

Row 660 depicts a device type condition and criteria. Each type of device may be identified as a low or high risk device in this example. Typically the more mobile a device, the higher the risk. While multiple devices are depicted such as may selected by an administrator, a single data processing apparatus may be depicted when being updated by a user.

Row 670 depicts an action type condition and criteria. Several types of actions are depicted in this example including opening an application such as a spreadsheet application, entering data to an application such as a browser, or even closing an application such as a database application. An action may be any type of action initiated by a user, the user device, of software. An action typically causes the software on the user device to resound in some manner. Many alternative types of actions may be used in alternative embodiment. If may be up to the user, administrator or even software application developer to determine which actions types may initiate invoking the security manager.

Row 680 depicts a maximum number of consecutive invalid passwords attempts allowed by the policy engine. For example, if n is set equal to 2, then after the third invalid attempt of a second password, the user must then provide the first password instead.

Figure 7:
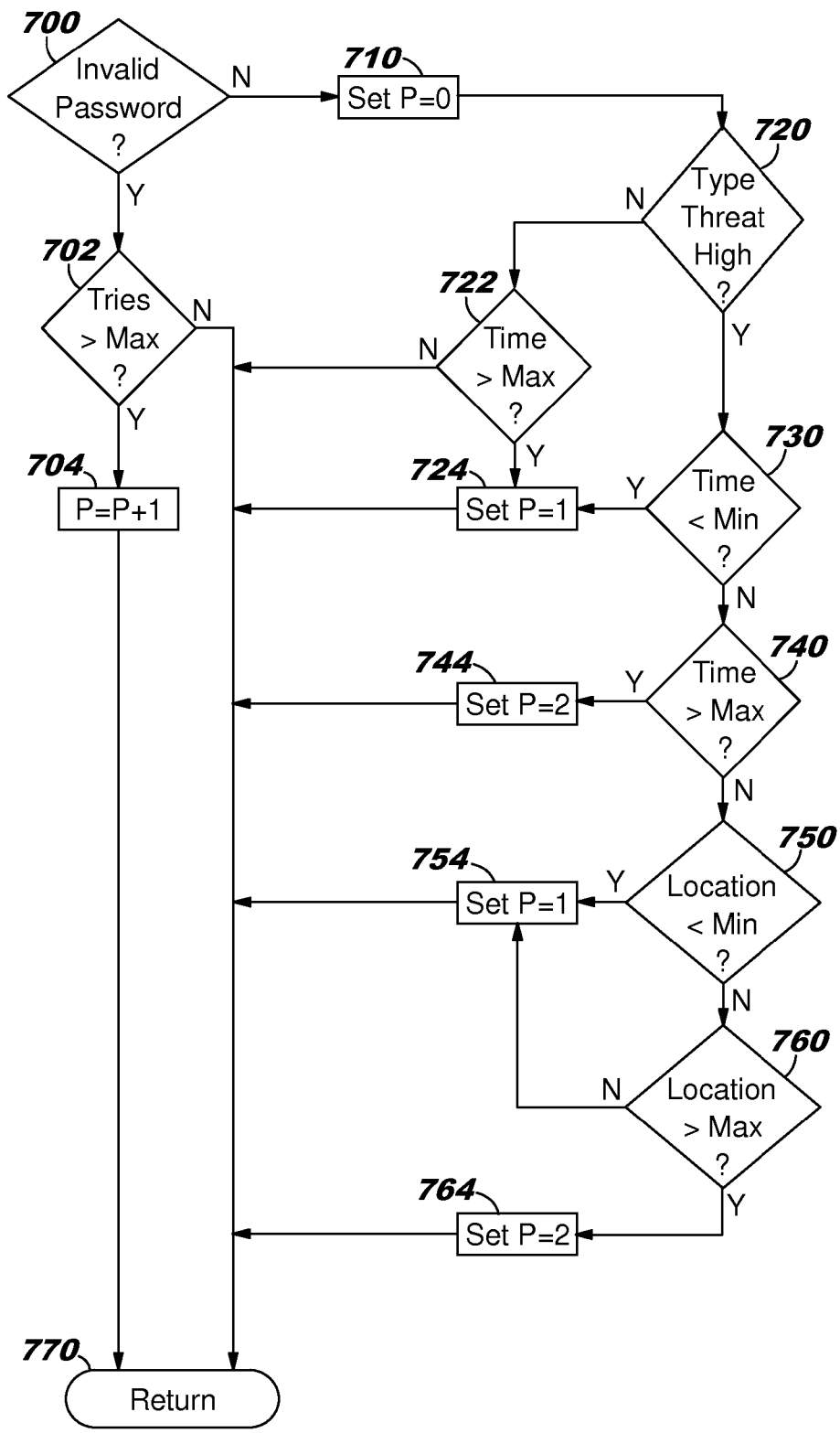
FIG. 7 further depicts a flowchart of the operation of a policy engine in which a second embodiment may be implemented.

FIG. 7 further depicts a flowchart of the operation of a policy engine in which a second embodiment may be implemented. This example utilizes the same conditions and criteria as the first embodiment, yet implements those conditions and criteria differently. Alternative embodiments may use other conditions or use alternative implementations.

In this second embodiment, as in the first embodiment, the variable P indicates what password the user must provide. If P is equal to 0, then no password is required. If P is equal to 1, then the second password is acceptable. If P is equal to 2, then the first password is required. If P is equal to 3, then access is denied. Alternative embodiments may use other methods for indicating which passwords may be acceptable in those embodiments.

In a first step 700, it may be determined whether an invalid password was previously provided. If not, then processing continues to step 710. If yes, then in step 702 it may be determined whether the number of invalid password attempts is greater than the number of acceptable tries. If no in step 702, then processing returns in step 702 to allow the user to attempt the password again. It yes in step 702, then P is increased by one and processing returns in step 770. As a result, if P was previously equal to 1 allowing a second password, then the user must now provide the first password. If P was previously equal to 2 allowing only a first password, then the user is denied access.

In step 710, P is set to 0. In step 720, it may be determined whether the type of threat is high, such as if the device is a mobile device. If no, the processing continues to step 722, otherwise processing continues to step 730. In step 722, if time since the last valid password is not greater than a maximum, then processing returns to the security manager in step 770. If time since the last valid password is greater than a maximum, then processing continues to step 724. In step 724, P is set equal to 1 and processing returns to the security manager in step 770.

In step 730, it may be determined whether time since the last valid password is less than a minimum. If yes, then processing continues to step 724 described above, otherwise processing continues to step 740.

In step 740, it may be determined whether the time since the last valid password is greater than a maximum. If yes, then in step 744 P is set equal to 2 and processing returns to the security manager through step 770. If time since the last valid password is not greater than a maximum, then processing continues to step 750.

In step 750, it may be determined whether the location of the data processing device is within a minimum distance of a desired location. If yes, then P is set equal to 1 in step 754 and processing returns to the security manager through step 710. If no, then processing continues to step 760. In step 760, if the location of the data processing device is within a maximum distance from a desired location, the processing continues to step 754 as described above. Otherwise, in step 764 P is set equal to 2 and processing returns to the security manager through step 770.

Although the first and second embodiments described above refer to a first and second password, alternative embodiments could utilize three or more passwords. In addition, these passwords could be fully independent or subsets of each other. For example, the second password could be a character string and the first password could be the same character string concatenated with a second character string such as a number generated by an encryption key generator.

Various types of conditions and criteria may be developed other than those described herein. For example, the security manager could be invoked when any application is initiated on a user device such as a mobile phone. For the first application or for any highly secure application, the first password may be required before access to that application is allowed. For applications with less security concerns, a second password or possibly no password may be required before access is provided. However, other conditions may apply as well. For example, even if an application has less security concerns, if a sufficient time has passed, a first password may be required anyway.

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EEPROM), or Flash memory, an optical fiber, a per cable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as the security manager or policy engine. A client data processing system may download that computer usable code, such as for storing on a data storage medium associated with the client data processing system, or for using in the client data, processing system. The server data processing system may similarly upload computer usable code from the client data processing system such as conditions and criteria for a policy engine. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of managing access to a computer system comprising:
    providing initial access to the computer system in response to a user providing a first password; and
    upon detecting a condition meeting a predetermined criteria including detecting less than a maximum elapsed time since the user provided the first password, providing subsequent access to the computer system in response to the user providing a second password wherein the first password has stronger security than the second password.

2. The method of claim 1 further comprising providing subsequent access to the computer system in response to the user providing a first password when the predetermined criteria are not met by the condition.

3. The method of claim 1 wherein detecting the condition meeting the predetermined criteria includes detecting less than a maximum number of consecutive invalid password attempts.

4. The method of claim 1 wherein detecting the condition meeting the predetermined criteria includes verifying an administrator defined set of predetermined criteria.

5. The method of claim 1 further comprising receiving a request from the computer system to manage access to the computer system, the request including the condition and the predetermined criteria.

6. The method of claim 1 wherein detecting the condition meeting the predetermined criteria includes detecting a current location of the user within a minimum distance from a desired location.

7. The method of claim 1 wherein detecting the condition meeting the predetermined criteria includes detecting a type of application being accessed.

8. The method of claim 1 wherein detecting the condition meeting the predetermined criteria includes detecting a type of device being used by the user.

9. The method of claim 1 further comprising receiving a request from the computer system to manage access to the computer system, the request including the condition and predetermined criteria, wherein detecting the condition meeting the predetermined criteria includes verifying an administrator defined set of predetermined criteria.

10. A computer usable program product comprising a computer usable storage including computer usable code for use in managing access to a computer system, the computer usable program product comprising code for performing the steps of:
    providing initial access to the computer system in response to a user providing a first password; and
    upon detecting a condition meeting a predetermined criteria including detecting less than a maximum elapsed time since the user provided the first password, providing subsequent access to the computer system in response to the user providing a second password wherein the first password has stronger security than the second password.

11. The computer usable program product of claim 10 further comprising providing subsequent access to the computer system in response to the user providing a first password when the predetermined criteria are not met by the condition.

12. The computer usable program product of claim 10 wherein detecting the condition meeting the predetermined criteria includes verifying an administrator defined set of predetermined criteria.

13. The computer usable program product of claim 10 wherein detecting the condition meeting the predetermined criteria includes detecting a current location of the user within a minimum distance from a desired location.

14. The computer usable program product of claim 10 wherein detecting the condition meeting the predetermined criteria includes detecting a type of application being accessed.

15. The computer usable program product of claim 10 wherein detecting the condition meeting the predetermined criteria includes detecting a type of device being used by the user.

16. A data processing system for managing access to a computer application stored in a data processing system memory, the data processing system comprising:
    a processor;
    a memory storing program instructions which when executed by the processor execute the steps of:
    providing initial access to the computer application in response to a user providing a first password; and
    providing subsequent access to the computer application upon detecting a condition meeting a predetermined criteria, including detecting less than a maximum elapsed time since the user provided the first password, in response to the user providing a second password wherein the first password is more complex than the second password.

17. The data processing system of claim 16 further comprising providing subsequent access to the computer system in response to the user providing a first password when the predetermined criteria are not met by the condition.

18. The data processing system of claim 16 wherein detecting the condition meeting the predetermined criteria includes verifying an administrator defined set of predetermined criteria.

19. The data processing system of claim 16 wherein detecting the condition meeting the predetermined criteria includes detecting a current location of the user within a minimum distance from a desired location.

20. The data processing system of claim 16 wherein detecting the condition meeting the predetermined criteria includes detecting a type of computer application being accessed.

\* \* \* \* \*